United States Patent
Tesanovic et al.

(10) Patent No.: US 12,192,826 B2
(45) Date of Patent: Jan. 7, 2025

(54) BUFFER STATUS REPORT WITH INTEGRATED ACCESS BACKHAUL

(71) Applicant: Samsung Electronics Co., Ltd., Suwon-si (KR)

(72) Inventors: Milos Tesanovic, Staines (GB); Jaehyuk Jang, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 71 days.

(21) Appl. No.: 18/048,401

(22) Filed: Oct. 20, 2022

(65) Prior Publication Data
US 2023/0125694 A1    Apr. 27, 2023

(30) Foreign Application Priority Data
Oct. 21, 2021    (GB) .................................... 2115157

(51) Int. Cl.
*H04W 28/02*    (2009.01)

(52) U.S. Cl.
CPC ................ *H04W 28/0278* (2013.01)

(58) Field of Classification Search
CPC ............... H04L 47/30; H04W 28/0278
See application file for complete search history.

(56) References Cited

U.S. PATENT DOCUMENTS

| | | | |
|---|---|---|---|
| 2013/0028223 A1 | 1/2013 | Kim et al. | |
| 2017/0127251 A1* | 5/2017 | Yi | ......................... H04W 76/14 |
| 2018/0270700 A1 | 9/2018 | Babaei et al. | |
| 2018/0302918 A1 | 10/2018 | Shaheen | |
| 2018/0352566 A1* | 12/2018 | Hong | .................... H04L 1/0029 |
| 2018/0368023 A1* | 12/2018 | Hong | ................. H04W 28/0278 |
| 2020/0137754 A1* | 4/2020 | Kim | ................... H04W 28/0278 |
| 2023/0188297 A1* | 6/2023 | Yang | ...................... H04L 5/0094 |
| | | | 370/329 |
| 2024/0073971 A1* | 2/2024 | Zhu | ........................ H04W 40/22 |

FOREIGN PATENT DOCUMENTS

| | | |
|---|---|---|
| EP | 1909442 A2 | 4/2008 |
| EP | 2420029 A1 | 2/2012 |
| EP | 3687204 A1 | 7/2020 |
| WO | 2010119390 A1 | 10/2010 |
| WO | 2019062461 A1 | 4/2019 |
| WO | 2020114058 A1 | 6/2020 |

(Continued)

OTHER PUBLICATIONS

Interdigital (WI rapporteur), R2-2109032, Feature summary of 8.4.2 (Rel-17 IAB contributions on fairness, latency and congestion), (Aug. 15, 2021) See section 3, figures 1, 2 (Year: 2021).*

(Continued)

*Primary Examiner* — Kashif Siddiqui

(57) ABSTRACT

A method for providing a Buffer Status Report (BSR) in a network is provided. The method comprises selecting a format of the BSR from among at least two BSR formats. The format of the BSR is selected based on one or more predetermined criteria. The predetermined criteria may comprise one or more of: a number of configured LCGs; a number of LCGs of a certain minimum priority; and/or a required level of BSR granularity.

25 Claims, 6 Drawing Sheets

(56) References Cited

FOREIGN PATENT DOCUMENTS

| | | |
|---|---|---|
| WO | 2020190201 A1 | 9/2020 |
| WO | 2020199829 A1 | 10/2020 |

OTHER PUBLICATIONS

International Search Report and Written Opinion of the International Search Authority dated Oct. 11, 2022, in connection with International Application No. PCT/KR2022/010245, 8 pages.

Combined Search and Examination Report dated Jun. 20, 2022, in connection with United Kingdom Application No. GB2115157.6, 12 pages.

3GPP TR 38.874 V16.0.0 (Dec. 2018), Technical Report, 3rd Generation Partnership Project; Technical Specification Group Radio Access Network; NR; Study on Integrated Access and Backhaul; (Release 16), Dec. 2018, 111 pages.

3GPP TS 38.321 V16.4.0 (Mar. 2021), Technical Specification, 3rd Generation Partnership Project; Technical Specification Group Radio Access Network; NR; Medium Access Control (MAC) protocol specification (Release 16), Mar. 2021, 157 pages.

Interdigital (Wi Rapporteur), R2-2109032, 3GPP TSG-RAN WG2 Meeting #115-e, E-meeting, Aug. 16-27, 2021, 9 pages.

Supplementary European Search Report dated May 22, 2024, in connection with European Patent Application No. 22883722.5, 12 pages.

* cited by examiner

BUFFER STATUS REPORT WITH INTEGRATED ACCESS BACKHAUL

CROSS-REFERENCE TO RELATED APPLICATION

This application is based on and claims priority under 35 U.S.C. § 119 to United Kingdom Patent Application No. 2115157.6, filed on Oct. 21, 2021, in the United Kingdom Intellectual Property Office, the disclosure of which is incorporated herein by reference in their entireties.

BACKGROUND

1. Field

The disclosure provides various techniques relating to Buffer Status Report (BSR), in particular in a network incorporating Integrated Access and Backhaul (IAB), for example within 3$^{rd}$ Generation Partnership Project (3GPP) 5th Generation (5G) New Radio (NR) and NR-based relay networks.

2. Description of Related Art 5G mobile communication technologies define broad frequency bands such that high transmission rates and new services are possible, and can be implemented not only in "Sub 6 GHz" bands such as 3.5 GHz, but also in "Above 6 GHz" bands referred to as mmWave including 28 GHz and 39 GHz. In addition, it has been considered to implement 6G mobile communication technologies (referred to as Beyond 5G systems) in terahertz bands (for example, 95 GHz to 3 THz bands) in order to accomplish transmission rates fifty times faster than 5G mobile communication technologies and ultra-low latencies one-tenth of 5G mobile communication technologies.

At the beginning of the development of 5G mobile communication technologies, in order to support services and to satisfy performance requirements in connection with enhanced Mobile BroadBand (eMBB), Ultra Reliable Low Latency Communications (URLLC), and massive Machine-Type Communications (mMTC), there has been ongoing standardization regarding beamforming and massive MIMO for mitigating radio-wave path loss and increasing radio-wave transmission distances in mmWave, supporting numerologies (for example, operating multiple subcarrier spacings) for efficiently utilizing mmWave resources and dynamic operation of slot formats, initial access technologies for supporting multi-beam transmission and broadbands, definition and operation of BandWidth Part (BWP), new channel coding methods such as a Low Density Parity Check (LDPC) code for large amount of data transmission and a polar code for highly reliable transmission of control information, L2 pre-processing, and network slicing for providing a dedicated network specialized to a specific service.

Currently, there are ongoing discussions regarding improvement and performance enhancement of initial 5G mobile communication technologies in view of services to be supported by 5G mobile communication technologies, and there has been physical layer standardization regarding technologies such as Vehicle-to-everything (V2X) for aiding driving determination by autonomous vehicles based on information regarding positions and states of vehicles transmitted by the vehicles and for enhancing user convenience, New Radio Unlicensed (NR-U) aimed at system operations conforming to various regulation-related requirements in unlicensed bands, NR UE Power Saving, Non-Terrestrial Network (NTN) which is UE-satellite direct communication for providing coverage in an area in which communication with terrestrial networks is unavailable, and positioning.

Moreover, there has been ongoing standardization in air interface architecture/protocol regarding technologies such as Industrial Internet of Things (IIoT) for supporting new services through interworking and convergence with other industries, Integrated Access and Backhaul (IAB) for providing a node for network service area expansion by supporting a wireless backhaul link and an access link in an integrated manner, mobility enhancement including conditional handover and Dual Active Protocol Stack (DAPS) handover, and two-step random access for simplifying random access procedures (2-step RACH for NR). There also has been ongoing standardization in system architecture/service regarding a 5G baseline architecture (for example, service based architecture or service based interface) for combining Network Functions Virtualization (NFV) and Software-Defined Networking (SDN) technologies, and Mobile Edge Computing (MEC) for receiving services based on UE positions.

As 5G mobile communication systems are commercialized, connected devices that have been exponentially increasing will be connected to communication networks, and it is accordingly expected that enhanced functions and performances of 5G mobile communication systems and integrated operations of connected devices will be necessary. To this end, new research is scheduled in connection with eXtended Reality (XR) for efficiently supporting Augmented Reality (AR), Virtual Reality (VR), Mixed Reality (MR) and the like, 5G performance improvement and complexity reduction by utilizing Artificial Intelligence (AI) and Machine Learning (ML), AI service support, metaverse service support, and drone communication.

Furthermore, such development of 5G mobile communication systems will serve as a basis for developing not only new waveforms for providing coverage in terahertz bands of 6G mobile communication technologies, multi-antenna transmission technologies such as Full Dimensional MIMO (FD-MIMO), array antennas and large-scale antennas, meta-material-based lenses and antennas for improving coverage of terahertz band signals, high-dimensional space multiplexing technology using Orbital Angular Momentum (OAM), and Reconfigurable Intelligent Surface (RIS), but also full-duplex technology for increasing frequency efficiency of 6G mobile communication technologies and improving system networks, AI-based communication technology for implementing system optimization by utilizing satellites and Artificial Intelligence (AI) from the design stage and internalizing end-to-end AI support functions, and next-generation distributed computing technology for implementing services at levels of complexity exceeding the limit of UE operation capability by utilizing ultra-high-performance communication and computing resources. In 3GPP 5G NR, Integrated Access and Backhaul (IAB) is a technique for providing wireless backhaul as an alternative to a fibre backhaul network. An IAB network comprises IAB nodes, at which wireless resources are shared between wireless backhaul and access links. Due to the limited coverage area of an IAB node, the backhaul network is typically implemented as a multi-hop network with backhaul traffic traversing multiple IAB nodes.

The IAB is based on NR whose scheduling mechanisms include Buffer Status Report (BSR). A UE transmits a BSR to a network node (e.g., gNB) to report the amount of data in the UE Uplink (UL) buffer available for transmission. A BSR may be triggered in a number of different circumstances, and may have a variety of different formats.

3GPP 5G Release 16 has been frozen and work on Release 17 is currently underway. An aim of Release 17 is to develop and improve features relating to IAB relative to the Release 16 baseline. These include achieving greater topology-wide fairness, developing BSR formats and triggers, and ensuring node inter-operability.

The above information is presented as background information only to assist with an understanding of the present disclosure. No determination has been made, and no assertion is made, as to whether any of the above might be applicable as prior art with regard to the disclosure.

SUMMARY

It is an aim of certain examples of the present disclosure to address, solve and/or mitigate, at least partly, at least one of the problems and/or disadvantages associated with the related art, for example at least one of the problems and/or disadvantages described herein. It is an aim of certain examples of the present disclosure to provide at least one advantage over the related art, for example at least one of the advantages described herein.

The present disclosure is defined in the independent claims. Advantageous features are defined in the dependent claims.

According to an aspect of the disclosure, a method for providing a Buffer Status Report (BSR) in a network is provided. The method includes selecting a format of the BSR from among at least two BSR formats, wherein the format of the BSR is selected based on a predetermined criteria, and wherein the predetermined criteria comprise a number of configured logical channel groups (LCGs).

According to another aspect of the disclosure, a network entity comprising a processor is provided. The processor is configured to select a format of the BSR from among at least two BSR formats, wherein the format of the BSR is selected based on a predetermined criteria, and wherein the predetermined criteria comprise a number of configured logical channel groups (LCGs).

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

The above and other aspects, features, and advantages of certain embodiments of the disclosure will be more apparent from the following description taken in conjunction with the accompanying drawings, in which.

DETAILED DESCRIPTION

Figure 1:
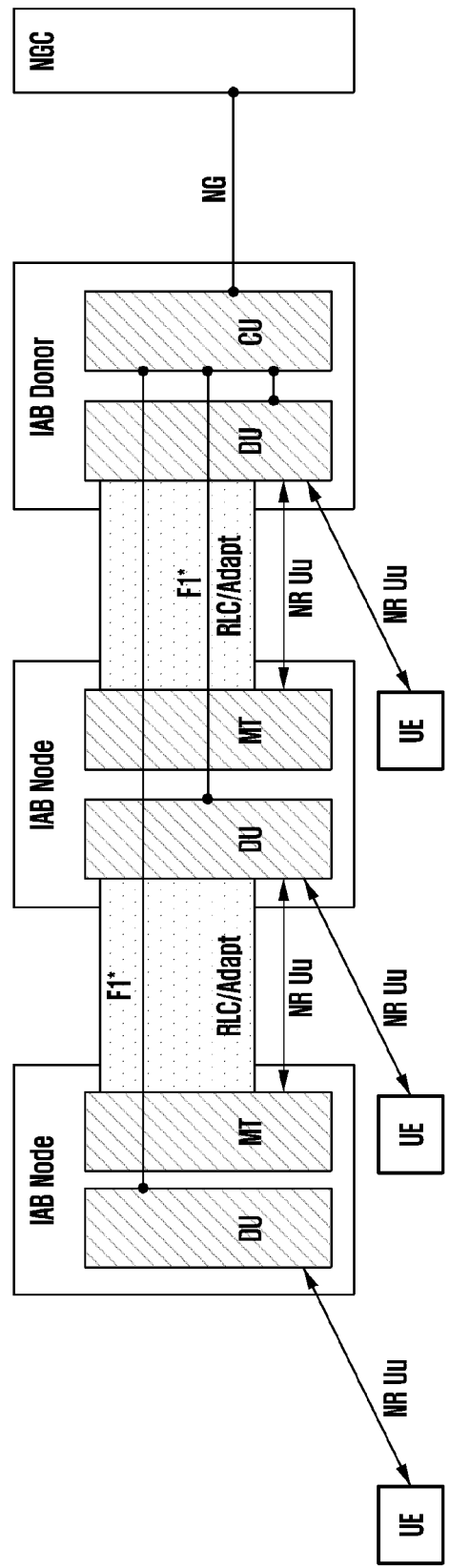
FIG. 1 illustrates an example architecture for multi-hop backhauling (source TR 38.874)

FIGS. 1 through 4, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

Abbreviations/Definitions

In the present disclosure, the following abbreviations and definitions may be used.

3GPP 3$^{rd}$ Generation Partnership Project
5G 5th Generation
5GC 5G Core
AMF Access and Mobility Management Function
BAP Backhaul Adaptation Layer
BH Backhaul
BS Buffer Status
BSR Buffer Status Report
CE Control Element
CP Control Plane
CU Central Unit
DU Distributed Unit eLCID extended LCID
F1 interface between DU and CU
F1-C F1 Control information
F1*-U Modified F1-U (carried over wireless backhaul in IAB)
FFS For Further Study
gNB 5G base station
GPRS General Packet Radio Service
GTP-U GPRS Tunnelling Protocol
IAB Integrated Access and Backhaul
ID Identity/Identification
IP Internet Protocol
IE Information Element
LCG Logical Channel Group
LCH Logical Channel
LCID Logical Channel ID
LTE Long Term Evolution
MAC Medium Access Control
MT Mobile Termination
N4 Interface between Control Plane and User Plane
NG Interface between 5G RAN and Core
NGC Control part of NG
NR New Radio
Oct Octet
PDCP Packet Data Conversion Protocol
PHY Physical
QoS Quality of Service
RAN Radio Access Network
RAN2 Radio layer 2 and Radio layer 3 Working Group
Rel Release
RLC Radio Link Control
RRC Radio Resource Control
SA mode Stand-Alone mode
SCH Shared Channel
SDAP Service Data Adaption Protocol
SMF Session Management Function
TR Technical Report
TS Technical Specification
UE User Equipment
UL UpLink
UPF User Plane Function
Uu Air interface between terminal and base station/access point
X2 interface between 2 base stations The following description of examples of the present disclosure, with reference to the accompanying drawings, is provided to assist in a comprehensive understanding of the disclosure, as defined by the claims. The description includes various specific details to assist in that understanding but these are to be regarded as merely exemplary. Accordingly, those of ordinary skill in the art will recognize that various changes and modifications of the examples described herein can be made.

The same or similar components may be designated by the same or similar reference numerals, although they may be illustrated in different drawings.

Detailed descriptions of techniques, structures, constructions, functions or processes known in the art may be omitted for clarity and conciseness, and to avoid obscuring the subject matter of the present disclosure.

The terms and words used herein are not limited to the bibliographical or standard meanings, but, are merely used to enable a clear and consistent understanding of the examples disclosed herein.

Throughout the description and claims, the words "comprise", "contain" and "include", and variations thereof, for example "comprising", "containing" and "including", means "including but not limited to", and is not intended to (and does not) exclude other features, elements, components, integers, steps, processes, functions, characteristics, and the like.

Throughout the description and claims, the singular form, for example "a", "an" and "the", encompasses the plural unless the context otherwise requires. For example, reference to "an object" includes reference to one or more of such objects.

Throughout the description and claims, language in the general form of "X for Y" (where Y is some action, process, function, activity or step and X is some means for carrying out that action, process, function, activity or step) encompasses means X adapted, configured or arranged specifically, but not necessarily exclusively, to do Y.

Features, elements, components, integers, steps, processes, functions, characteristics, and the like, described in conjunction with a particular aspect, embodiment, example or claim are to be understood to be applicable to any other aspect, embodiment, example or claim disclosed herein unless incompatible therewith.

Embodiments or examples disclosed in the description and/or figures falling outside the scope of the claims are to be understood as examples useful for understanding the disclosure.

Other aspects, advantages, and salient features of the disclosure will become apparent to those skilled in the art from the following detailed description taken in conjunction with the accompanying drawings.

The following examples are applicable to, and use terminology associated with, 3GPP 5G. However, the skilled person will appreciate that the techniques disclosed herein are not limited to these examples or to 3GPP 5G, and may be applied in any suitable system or standard, for example one or more existing and/or future generation wireless communication systems or standards. The skilled person will appreciate that the techniques disclosed herein may be applied in any existing or future releases of 3GPP 5G NR or any other relevant standard.

For example, the functionality of the various network entities and other features disclosed herein may be applied to corresponding or equivalent entities or features in other communication systems or standards. Corresponding or equivalent entities or features may be regarded as entities or features that perform the same or similar role, function, operation or purpose within the network. For example, the functionality of an IAB node in the examples below may be applied to any other suitable type of entity performing functions of a network node.

The skilled person will appreciate that certain examples of the present disclosure may not be directly related to standardization but rather proprietary implementation of some of the Integrated Access and Backhaul (IAB) functions or non-IAB related functions of NR Rel-17 and beyond networks.

The skilled person will appreciate that the present disclosure is not limited to the specific examples disclosed herein. For example:
  The techniques disclosed herein are not limited to 3GPP 5G.
  The techniques disclosed herein are not limited to IAB or relay networks.
  One or more entities in the examples disclosed herein may be replaced with one or more alternative entities performing equivalent or corresponding functions, processes or operations.

One or more of the messages in the examples disclosed herein may be replaced with one or more alternative messages, signals or other type of information carriers that communicate equivalent or corresponding information.

One or more further elements, entities and/or messages may be added to the examples disclosed herein.

One or more non-essential elements, entities and/or messages may be omitted in certain examples.

The functions, processes or operations of a particular entity in one example may be divided between two or more separate entities in an alternative example.

The functions, processes or operations of two or more separate entities in one example may be performed by a single entity in an alternative example.

Information carried by a particular message in one example may be carried by two or more separate messages in an alternative example.

Information carried by two or more separate messages in one example may be carried by a single message in an alternative example.

The order in which operations are performed may be modified, if possible, in alternative examples.

The transmission of information between network entities is not limited to the specific form, type and/or order of messages described in relation to the examples disclosed herein.

Certain examples of the present disclosure may be provided in the form of an apparatus/device/network entity configured to perform one or more defined network functions and/or a method therefor. Such an apparatus/device/network entity may comprise one or more elements, for example one or more of receivers, transmitters, transceivers, processors, controllers, modules, units, and the like, each element configured to perform one or more corresponding processes, operations and/or method steps for implementing the techniques described herein. For example, an operation/function of X may be performed by a module configured to perform X (or an X-module). Certain examples of the present disclosure may be provided in the form of a system (e.g., a network) comprising one or more such apparatuses/devices/network entities, and/or a method therefor. For example, in the following examples, a network may include one or more IAB nodes.

It will be appreciated that examples of the present disclosure may be realized in the form of hardware, software or a combination of hardware and software. Certain examples of the present disclosure may provide a computer program comprising instructions or code which, when executed, implement a method, system and/or apparatus in accordance with any aspect, claim, example and/or embodiment disclosed herein. Certain embodiments of the present disclosure provide a machine-readable storage storing such a program.

To satisfy extremely high data rate requirements, the 3GPP 5G NR standard utilises communication frequencies in a relatively high range, from 30 GHz to 300 GHz, corresponding to wavelengths in the millimetre (mm) range (mmWave communication). Such mmWave communication provides a large available bandwidth and high transmission speeds. However, problems with mmWave communication include severe signal path loss and low penetration, resulting in a relatively short transmission range. This in turn requires a greater density of base stations deployment.

Due to the relatively high cost and other difficulties associated with deployment of fibre transport network links, wireless backhauling can be used as an alternative. Integrated Access and Backhaul (IAB), in which a part of the radio resources is used for backhauling, is standardized in 3GPP Rel-16.

According to 3GPP TR 38.874, the backhaul architecture supports multi-hop backhauling in which backhaul traffic is wirelessly relayed by network nodes via one or more hops with some hops using mmWave communication in certain deployments. Multi-hop backhauling provides more range extension than single hop. This is especially beneficial for above-6 GHz frequencies due to their limited range. Multi-hop backhauling further enables backhauling around obstacles, e.g., buildings in urban environment for in-clutter deployments.

Also according to TR 38.874, IAB reuses existing functions and interfaces defined for access. In particular, Mobile-Termination (MT), gNB-DU, gNB-CU, UPF, AMF and SMF as well as the corresponding interfaces NR Uu (between MT and gNB), F1, NG, X2 and N4 are used as baseline for the IAB architectures.

The Mobile-Termination (MT) function has been defined as a component of the Mobile Equipment, and is referred to as a function residing on an IAB-node that terminates the radio interface layers of the backhaul Uu interface toward the IAB-donor or other IAB-nodes.

FIG. 1 illustrates one example architecture for multi-hop backhauling defined in TR 38.874, showing the reference diagram for a two-hop chain of IAB-nodes underneath an IAB-donor, where the IAB-node and the UE connect in SA-mode to an NGC.

An IAB-node may be defined as a RAN node that supports wireless access to UEs and wirelessly backhauls the access traffic. An IAB-donor may be defined as a RAN node which provides UE's interface to core network and wireless backhauling functionality to IAB-nodes.

The architecture of FIG. 1 leverages CU/DU-split architecture. That is, the IAB donor node comprises a Central Unit (CU) and one or more Distributed Units (DUs), with an interface called F1 between them. The functionality of the IAB donor is divided between the CU (hosting Radio Resource Control (RRC), Service Data Adaption Protocol (SDAP) and Packet Data Conversion Protocol (PDCP), and which terminates the F1 interface connected with the DU) and DU (hosting Radio Link Control (RLC), Medium Access Control (MAC) and Physical (PHY) layers, and which terminates the F1 interface with the CU) logical nodes. The internal structure (CU/DU) of the IAB donor is not visible to other nodes and the 5G core network (5GC). See 3GPP TS 38.401.

In the architecture of FIG. 1, each IAB-node holds a DU and an MT. Via the MT, the IAB-node connects to an upstream IAB-node or the IAB-donor. Via the DU, the IAB-node establishes RLC-channels to UEs and to MTs of downstream IAB-nodes. For MTs, this RLC-channel may refer to a modified RLC*. An IAB-node can connect to more than one upstream IAB-node or IAB-donor DU. The IAB-node may contain multiple DUs, but each DU part of the IAB-node has F1-C connection only with one IAB-donor CU-CP.

The donor also holds a DU to support UEs and MTs of downstream IAB-nodes. The IAB-donor holds a CU for the DUs of all IAB-nodes and for its own DU. It is assumed that the DUs on an IAB-node are served by only one IAB-donor. This IAB-donor may change through topology adaptation. Each DU on an IAB-node connects to the CU in the IAB-donor using a modified form of F1, which is referred to as F1*. F1*-U runs over RLC channels on the wireless backhaul between the MT on the serving IAB-node and the DU on the donor. An adaptation layer is added—named Backhaul Adaptation Layer (BAP)—which performs bearer mapping and routing. It replaces the IP functionality of the standard F1-stack. F1*-U may carry a GTP-U header for the end-to-end association between CU and DU.

The Uu interface represents the interface between the UE and the DU in an IAB node. The F1* interface represents the interface between the IAB DU and an upstream CU.

Figure 2:
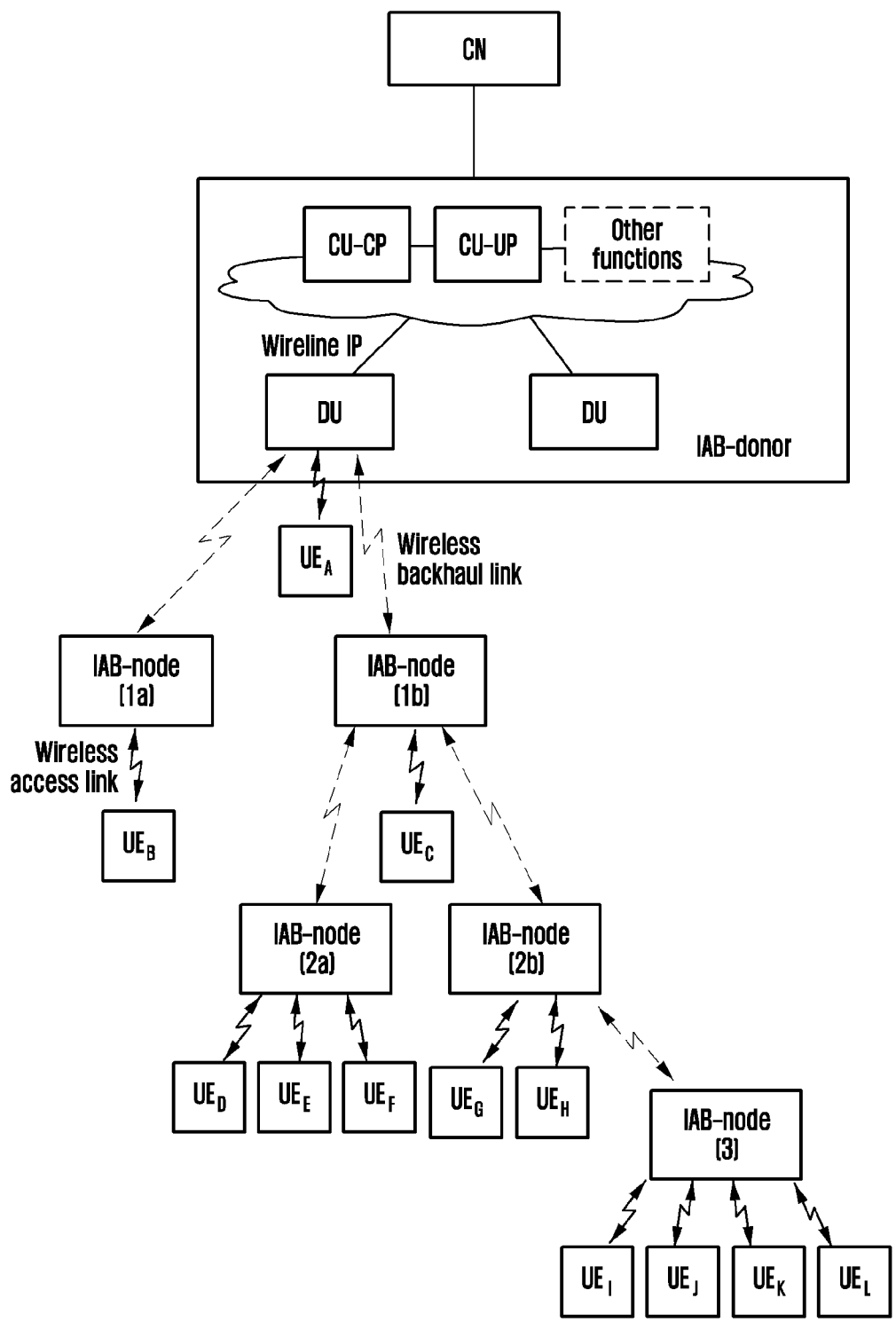
FIG. 2 illustrates an example IAB network topology according to an embodiment of the disclosure.

FIG. 2 illustrates an example IAB network topology. Improvements to topology-wide fairness is one of the objectives of the Rel-17 IAB work. While working on Rel-16, the assumption was that fairness would be enabled by implementation and ensured by operators. In Rel-17, there is a desire to provide normative mechanisms to ensure and improve fairness across the topology.

The Technical Report on IAB (TR 38.874 v16.0.0, published in December 2018 and capturing the outcome of the Study Item phase) discusses fairness in IAB networks by stating the following (which is not binding in any normative way):

"An IAB network should attempt to schedule the wireless resources to meet each UE bearer's requirement regardless of the number of hops a given UE is away from the Donor DU."

The following observation is then made with regards to an important difference between 1:1 and N:1 bearer mapping across the backhaul:

"When one-to-one mapping is used between UE bearer and RLC-channel on the backhaul, the IAB-node has explicit information on each UE bearer and can therefore apply appropriate QoS differentiation among QoS profiles, as well as fairness among UE bearers with same QoS profile.

While QoS differentiation is still possible when UE bearers are aggregated to backhaul RLC-channels, enforcement of fairness across UE bearers becomes less granular."

In NR and LTE networks, in order to assist scheduling done by the base station/access point, the terminal (UE) provides feedback on the occupancy of its buffers. This mechanism is known as Buffer Status Reporting, or BSR. BSR can be trigger-based or configured to be sent periodically and uses several different formats (3GPP TS 38.321). For purposes of BSR, radio bearers/logical channels are grouped into LCH groups, or LCGs. In NR Rel-16, the number of LCGs is limited to 8.

At RAN2 meeting RAN2#113bis-e, April 2021 the following was agreed:

"LCG range to be extended for IAB MT. Size of LCG and enhancements to BSR are FFS"

This agreement—which essentially introduces finer reporting of buffer status—may be viewed as (among other things) a way to assist in alleviating the above-mentioned issue with fairness in IAB networks, because:

It can ensure better QoS management—e.g., if bearers are mapped onto BH channels in a 1:1 manner, but then if there is a need to group them for purposes of buffer status reporting into 'just' 8 groups (as per Rel-16 NR baseline)—then this cancels out some of the benefits of the 1:1 mapping.

It can help prevent congestion on the uplink by identifying a specific LCH or a small group of LCHs where a buffer is close to a threshold, and then schedule/bring forward for scheduling just those LCHs.

It can ensure per-bearer or per-UE scheduling.

At RAN2 meeting RAN2#115-e, August 2021 the following was also agreed:

"The length of LCG to be extended to 8 bits (i.e., at most 256 LCGs).

New Short (Truncated) BSR format to specified that has a fixed size and consists of an 8-bit LCG ID field and an 8-bit Buffer Size field."

Certain examples of the present disclosure provide one or more extended BSR formats, one or more techniques for selecting a BSR format, one or more techniques for switching between different formats, and/or one or more techniques for triggering a BSR.

The following examples are disclosed in relation to IAB application. However, the skilled person will appreciate that the various techniques disclosed herein are not limited to IAB-MTs and may be applied to UEs in general, as well as to different types of BSR. For example, the techniques (e.g., formats and/or triggers) disclosed herein may be applied to "normal" BSR (e.g., BSR exchanged on the NR Uu interface between a UE and a network node, as well as on the NR Uu interface between two IAB nodes), but may also be applied to pre-emptive BSR and Sidelink BSR (e.g., see 3GPP TS 38.321). References in the present disclosure to BSR include references to any suitable type of BSR to which the techniques may be applied, including the types mentioned above.

According to an aspect of the present disclosure, in various examples, a BSR format may be selected (or switched) from among two or more different formats. The skilled person will appreciate that any suitable formats may be used, for example the formats illustrated in FIGS. 3A-3C. However, the present disclosure is not limited to these examples.

For example, the same way that the "Short" BSR format has been extended, the following formats may also be extended: "Long", "Long Truncated", "Pre-emptive" BSR, and others. The techniques described herein may be applied to any formats ("old") and their extended versions. The details of the "old" formats are available in TS 38.321, for example. The details of certain extended formats have not yet been agreed in the standard (except for the Short BSR, as illustrated in the figures). However, a particular format may be extended in any suitable manner, for example use 256 LCG fields instead of 8. The Buffer size field may be kept the same size or could be changed.

According to another aspect of the present disclosure, in various examples, the selection of a particular format may be based on one or more criteria. For example the criteria may comprise one or more of: a number of configured LCGs; a number of LCGs of a certain minimum priority; a required level of BSR granularity; a number of LCGs which have data to transmit; size of the grant; and/or size of the padding. However, the present disclosure is not limited to these examples.

According to another aspect of the present disclosure, in various examples, any suitable network entity may make the selection of BSR format. For example, in an IAB network, the selection may be made by the IAB-DU of the parent node or the IAB-Donor-DU via appropriate configuration signaling sent to the IAB-MT of the child node, or an IAB-MT of a child node. However, the present disclosure is not limited to these examples.

According to another aspect of the present disclosure, in various examples, the selection of a particular BSR format may be signalled or indicated in the network (e.g., to/from an IAB-DU, IAB-Donor-DU, and/or IAB-MT) using any suitable technique. Various non-limiting examples are described herein.

According to another aspect of the present disclosure, in various examples, a received BSR may be interpreted according to any suitable criteria, for example according to one or more aspects of the configuration of LCGs. Various non-limiting examples are described herein.

The skilled person will appreciate that the above aspects may be applied in any suitable combination in various examples of the present disclosure.

Figure 3A:
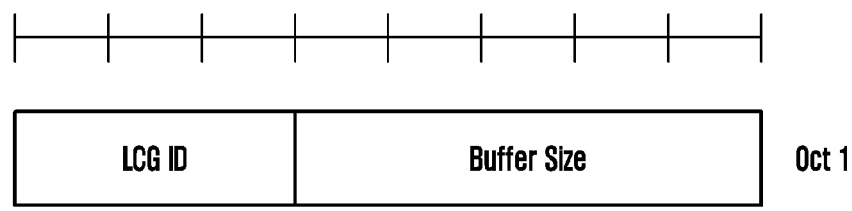
FIG. 3A illustrates a first BSR format according to an embodiment of the disclosure.
Figure 3B:
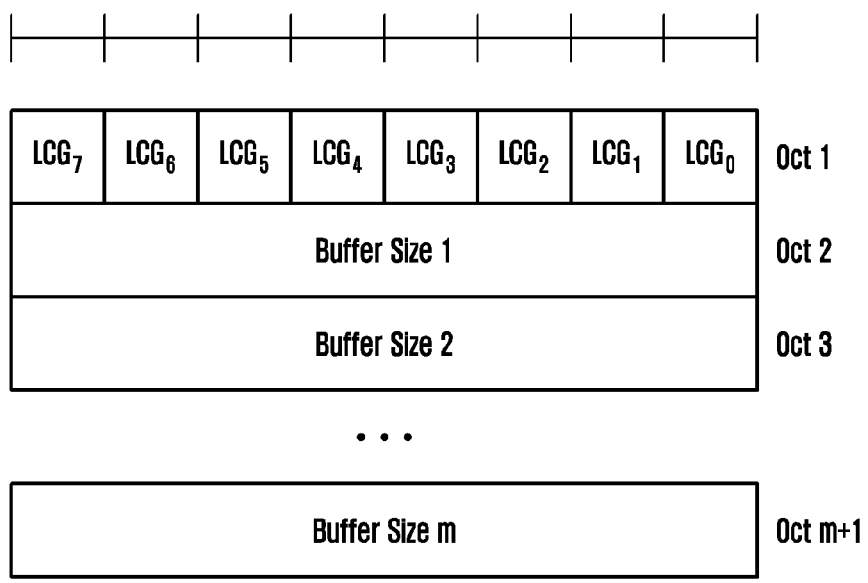
FIG. 3B illustrates a second BSR format according to an embodiment of the disclosure.
Figure 3C:
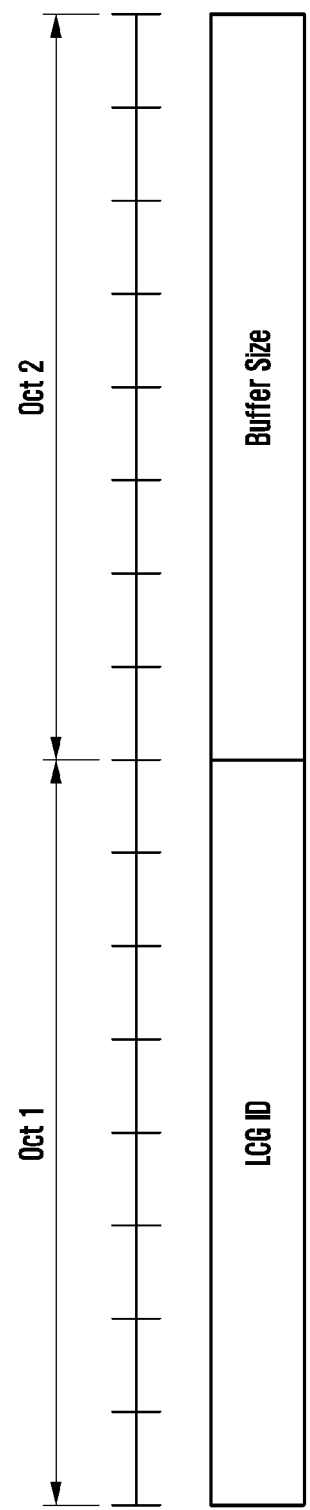
FIG. 3C illustrates a third BSR format according to an embodiment of the disclosure.

FIGS. 3A-3C illustrate exemplary BSR formats. In particular, FIG. 3A illustrates the Short BSR format and FIG. 3B illustrates the Long BSR format used in NR Rel-16 (3GPP TS 38.321 v16.4.0). FIG. 3C illustrates the new Short BSR format according to the agreement in RAN2 meeting RAN2#115-e, August 2021.

In FIG. 3A, the LCG ID field identifies the Logical Channel Group whose buffer status is being reported. As illustrated in FIG. 3A, the length of the LCG ID field is 3 bits, allowing for 8 different LCGs. The Buffer Size field (or Buffer Status field) contains a value representing the total amount of data available across all logical channels of an LCG. In particular, the Buffer Size field contains a value which is used as an index to a lookup table that maps different index values to different ranges of data size. As illustrated in FIG. 3A, the length of the Buffer Size field is 5 bits, allowing for 32 different data size ranges. The LCG ID and Buffer Size fields together occupy one octet (Oct 1).

In FIG. 3B, a first octet (Oct 1) comprises eight 1-bit fields (LCG0, . . . , LCG7) corresponding to respective different LCGs. Each LCGi field is set to a value (0 or 1) indicating whether the corresponding LCG has data available (1) or does not have data available (0). As illustrated in FIG. 3B, there are 8 LCGi fields allowing for 8 LCGs. The following m octets (Oct 2, . . . , Oct m+1) are Buffer Size fields indicating the total amount of data available for respective LCGs indicated as having data available. The Buffer Size fields are included in ascending order based on the LCGi.

The BSR format illustrated in FIG. 3C is similar to the format illustrated in FIG. 3A except that the length of the LCG ID field is 8 bits, allowing for 256 different LCGs, and the length of the Buffer Size field is 8 bits, allowing for 256 different data size ranges. The LCG ID and Buffer Size fields together occupy two octets (Oct 1 and Oct 2).

A BSR is typically encapsulated as a Medium Access Control (MAC) Control Element (CE). The BSR formats are identified by MAC subheaders with predefined LCID values, while a Pre-emptive BSR format is identified by a MAC subheader with a predefined two-octet eLCID (see 3GPP TS 38.321 V16.4.0 for example). There is one LCID field per MAC subheader. The LCID field size is 6 bits. If the LCID field is set to 34 or 33, one or two additional octet(s) is/are present in the MAC subheader containing the eLCID field. The LCID field of the MAC subheader identifies the type of the corresponding MAC CE. For example, for UL-SCH, LCID values of 59, 60, 61 and 62 indicate "Short Truncated BSR", "Long Truncated BSR", "Short BSR" and "Long BSR", respectively, while values 35-44 are reserved. For UL-SCH, the value of two-octet eLCID identifies the logical channel. For UL-SCH, a one-octet eLCID value (codepoint) of 255 indicates "Pre-emptive BSR", while values (codepoint) 0-249 are reserved.

The skilled person will appreciate that the techniques disclosed herein are not limited to the formats illustrated in FIGS. 3A-3C. For example, formats with different field lengths may be used.

In certain examples, a certain network entity may configure a certain BSR format to use, or may configure switching between different formats when needed. In the case of an IAB network, the network entity may be the IAB-DU of the parent node or the IAB-Donor-DU. For example, the network entity may select one of the format ('old format') illustrated in FIG. 3A (allowing 8 LCGs) or the format ('extended format') illustrated in FIG. 3C (allowing 256 LCGs), or may configure to switch between the Formats of FIGS. 3A and 3C.

The selection of a certain format and/or the switching between formats may be based on any suitable criteria. For example, the extended format may be selected or switched to if a relatively fine reporting of buffer status and/or relatively high number of LCGs are required, while the old format may be selected or switched to if a relatively coarse reporting of buffer status and/or relatively low number of LCGs are adequate.

In certain examples, switching between different formats may be performed according to explicit signaling (e.g., RRC signaling). For example, when the LCH grouping into LCGs is changed (e.g., between 8 LCGs and 256 LCGs, for example in response to an estimated number of padding bits, or in response to changes in upstream traffic e.g., admission of new UEs attaching to the child node and/or descendent nodes, or in response to changes in type/priority of upstream traffic, or in response to changing requirements for finer granularity scheduling and higher degree of fairness as embodied by changes in parameters of e.g., Proportional Fair Scheduler at the parent node), RRC configuration may be used to explicitly indicate a switch between the corresponding format.

In other examples, switching between different formats may be implicit. For example, RRC signaling may reconfigure only the number of LCGs (256↔8) and the IAB-MT may change from one predefined grouping (or previously used/historical grouping) to another grouping, such that the number of LCGs/grouping signalled implies the use of a corresponding format. Alternatively, if the IAB-MT reports the buffer status for only LCG IDs 0-7, or any other sub-set of 8 LCGs (known to both IAB-MT and IAB-DU), then this may imply the use of the old format (especially if the IAB-MT is configured to report for all LCGs). In another example, the switching between different formats may be implicit from MAC signaling, for example when polling for BSR, or according to a newly defined MAC CE. Such a MAC CE could either be used to configure and activate a change in LCG configuration, or to activate a change in LCG configuration previously configured by RRC signaling.

In certain examples, a predefined field in a certain RRC IE may contain two different values for the case where two groupings are used. Alternatively, the field may contain a single value which is changed when the grouping is reconfigured. Or, the field may contain a single value which is not explicitly changed by the network, however the IAB-MT is allowed to use a format not conventionally linked to this particular value, as explained elsewhere in the present disclosure. For example, the logicalChannelGroup field of the LogicalChannelConfig IE may be used (see 3GPP TS 38.331 V16.6.0, Section 6.3.2). This field contains the ID of the logical channel group to which the logical channel being configured belongs.

In certain examples, the IAB-MT may select a format (e.g., extended or old) to use. In this case, the IAB-DU may determine which format is being used based on the LCID/eLCID. In certain examples both groupings may be configured and the IAB-MT may choose between the two. This example may be advantageous for example in the case of padding, where the IAB-DU of the parent node may not know the exact number of padding bits. Alternatively, a single LCG grouping may be configured, and if the IAB node only has Buffer Status (BS) for fewer than 8 LCGs (and thus both old or extended BSR formats can be used), and if relevant LCG IDs are 0-7, the IAB-MT may send the old format. The latter example may assume that the network allocates high priority LCGs to values of LCG IDs of 0-7. This example may be advantageous in the case of only 1 LCG having (new) data, where the legacy 'short' BSR (FIG. 3A) may be frequently used for e.g., the truncated short BSR case (padding BSR).

Currently (as per 3GPP TS 38.321), the BSR is only triggered if new UL data belongs to a logical channel with higher priority than the priority of any logical channel containing available UL data which belong to any LCG; or if none of the other logical channels which belong to an LCG contain any available UL data.

Certain examples of the present disclosure may operate with the current triggering mechanisms. However, the interpretation of the received BSR may need to be modified.

For example, if an IAB-MT sends the 'old' Long BSR format containing only 8 LCGIDs (for example according to certain examples disclosed herein) then the IAB-DU may assume that none of the other (256−8=248) LCGs have any data. In other words, if the Extended Long BSR format had been used, values for relevant LCG IDs would have been zero, and no buffer size for those LCGs would have been reported. In certain examples, the IAB-DU may assume that none of the other LCGs have an amount of data that exceeds a certain threshold, or a certain priority.

In an alternative example of interpretation, which may be advantageous for example in the case where both groupings are configured for an IAB-MT, the 8 LCGs for which the buffer status is reported using the 'old' format are the ones whose buffer status exceed a certain (pre-defined or configurable) threshold. Alternatively, these are the 8 LCGs with highest priorities among those who have data in the buffers, or the 8 LCGs where new data has arrived, or a mix of these two criteria.

In some situations, a BSR may be sent as padding. However, if the overall size of the BSR format (e.g., the overall size of a MAC CE encapsulating the BSR, including header) is larger than an amount of space available for padding, then it may not be possible to send the BSR in that particular format. This problem may occur more frequently if the size of the BSR is increased in order to extend the number of LCGs, for example using certain techniques described herein. For example, when two octets are used (e.g., the example of FIG. 3C), then in some cases (e.g., where there is very little room for padding), the BSR cannot be sent when it would normally be sent as padding.

However, in certain examples, it may be possible to switch between different BSR formats (e.g., between the formats of FIGS. 3A and 3C) when necessary. For example, a Rel-17 IAB-MT may switch between an enhanced (Rel-17) BSR (e.g., FIG. 3C) and an old format BSR (e.g., FIG. 3A) if the above problem arises.

In certain examples, in particular those involving padding BSR, the IAB-MT may have authority to switch from the extended format to the old format. The criteria disclosed above may allow the IAB-DU to interpret the content of the old format appropriately.

Certain examples of the present disclosure address interoperability issues when nodes with different capabilities or configurations (e.g., Rel-16 and Rel-17 nodes) are adjacent (e.g., have a parent/child relationship) to each other. For example, one problem is that a node of a first type (e.g., a Rel-16 node) may not understand a BSR (e.g., Rel-17 Extended BSR) configured or formatted for a node of a second type (e.g., a Rel-17 node).

In certain examples, the above problem may be avoided by appropriate configuration. For example, an IAB-donor may consider the topology and supported features and only configure a BSR of a certain configuration/format (e.g., a Rel-17 BSR) when this will be understood by/useful to an adjacent node.

In certain examples, in a situation where a node does not understand a BSR, the node may drop the BSR. For example, since the (e)LCID and/or the format itself (e.g., number of octets) may be unrecognizable to the receiving node, the Rel-16 node may just drop the BSR from Rel-17 node.

In certain examples, the network may configure Rel-17 nodes to only report Rel-16 compliant BSRs.

Certain examples of the present disclosure may provide a capability to allow a node to indicate support for a BSR of certain format, for example one or more of the formats disclosed above (e.g., a Rel-17 BSR). The feature may be configured to a child node based on its capability (for example similar to other features). In some cases, for example in networks including mobile nodes, or in the case of link failures leading to topology changes, the compatibility of neighbouring nodes may change. It is therefore beneficial for a node to be able to signal support for BSR of a certain format (e.g., Rel-17 BSR).

Certain examples of the present disclosure provide a method for providing a Buffer Status Report (BSR) in a network, the method comprising: selecting a format of the BSR from among at least two BSR formats, wherein the format of the BSR is selected based on one or more predetermined criteria.

Certain examples of the present disclosure provide a method for providing a Buffer Status Report (BSR) in a network, the method comprising: selecting a format of the BSR from among at least two BSR formats, wherein the format of the BSR is selected based on one or more predetermined criteria, wherein a first format of BSR comprises one octet including an LCG ID field of length 3 bits and a Buffer Size field of length 5 bits, and wherein a second format of BSR comprises two octets including an LCG ID field of length 8 bits and a Buffer Size field of length 8 bits.

Certain examples of the present disclosure provide a method for providing a Buffer Status Report (BSR) in a network, the method comprising: selecting a format of the BSR from among at least two BSR formats, wherein the format of the BSR is selected based on one or more predetermined criteria, wherein the predetermined criteria comprise one or more of: a number of configured LCGs; a number of LCGs of a certain minimum priority; a required level of BSR granularity; a number of LCGs which have data to transmit; size of the grant; and/or size of the padding, wherein a first format of the BSR comprises one octet including an LCG ID field of length 3 bits and a Buffer Size field of length 5 bits, and wherein a second format of the BSR comprises two octets including an LCG ID field of length 8 bits and a Buffer Size field of length 8 bits.

Certain examples of the present disclosure provide a method for providing a Buffer Status Report (BSR) in a network, the method comprising: selecting a format of the BSR from among at least two BSR formats, wherein the format of the BSR is selected based on one or more predetermined criteria, wherein the predetermined criteria comprise one or more of: a number of configured LCGs; a number of LCGs of a certain minimum priority; and/or a required level of BSR granularity.

In certain examples, the predetermined criteria may further comprise one or more of: a number of LCGs which have data to transmit; size of the grant; and/or size of the padding.

In certain examples, a first format of the BSR may comprise one octet including an LCG ID field of length 3 bits and a Buffer Size field of length 5 bits.

In certain examples, a second format of the BSR may comprise two octets including an LCG ID field of length 8 bits and a Buffer Size field of length 8 bits.

In certain examples, a third format may be a Long BSR format (see the annex to the description).

In certain examples, a fourth format may be an Extended Long BSR format (see the annex to the description).

In certain examples, the Buffer Size field may indicate a total amount of data available for transmission associated with an LCG identified based on the LCG ID field.

In certain examples, selecting the format may comprise switching from a first format of BSR to a second format of the BSR (e.g., in response to a change of LCH grouping, in response to estimated number of padding bits).

In certain examples, the BSR format may be selected by an IAB-DU of a parent node or an IAB-Donor-DU in an IAB network.

In certain examples, the selected format may be indicated in the network based on one or more of: explicit RRC configuration (e.g., a change of LCH grouping into LCGs); RRC signaling reconfiguring the number of LCGs; the number of LCGs for which buffer status is reported; and MAC signaling.

In certain examples, the LCH grouping may be indicated based on one or more values in a predetermined field (e.g., logicalChannelGroup field) of a predetermined IE (e.g., LogicalChannelConfig).

In certain examples, the LCH grouping may be indicated based on a number of LCGs.

In certain examples, the selection of a BSR format, or the switching between BSR formats may be triggered based on a change of a maximum number of LCGs.

In certain examples, the BSR format may be selected by an IAB-MT of a child node in an IAB network.

In certain examples, the selected format may be indicated in the network based on an LCID and/or an eLCID associated with a BSR having the selected format.

In certain examples, a first grouping of logical channels into a first number (e.g., 8) of LCGs, and/or a second grouping of logical channels into a second higher number (e.g., 256) of LCGs may be configured.

In certain examples, the BSR format may be selected based on which grouping or groupings of logical channels are configured and/or the number of LCGs having Buffer Status to report.

In certain examples, when both the first grouping and the second grouping are configured, the BSR format may be selected from a first BSR format capable of indicating Buffer Status for the first number of LCGs and a second BSR format capable of indicating Buffer Status for the second number of LCGs.

In certain examples, when only the second grouping is configured, and when a node (e.g., IAB node) has Buffer Status for fewer than or equal to the first number of LCGs (e.g., highest priority LCGs), the first BSR format may be selected.

In certain examples, when only the second grouping is configured, and when a node (e.g., IAB node) estimates that the UL grant or padding cannot accommodate the second BSR format, the first BSR format is selected.

In certain examples, the method may further comprise receiving a BSR having a format capable of indicating Buffer Status for up to a first number, m (e.g., 8), of LCGs, wherein when a second higher number, n (e.g., 256), of LCGs are configured, determining that up to m LCGs having a certain characteristic among the n LCGs have a Buffer Status reported in the received BSR, and that the other LCGs among the n LCGs do not have their Buffer Status reported (e.g., no data, or an amount of data less than a threshold (e.g., predefined or configurable), or priority lower than a threshold).

In certain examples, the first number of LCGs may be used if only a number not greater than m of LCGs corresponding to a pre-defined set of m LCGIDs have data to transmit.

In certain examples, the certain characteristic may comprise one or more of: LCGs for which there is data available for transmission; LCGs for which there is new data available for transmission; highest priority LCGs; and highest priority LCGs among LCGs for which there is data available for transmission.

Certain examples of the present disclosure provide a first network entity (e.g., an IAB-DU, an IAB-Donor-DU or an IAB-MT) configured to operate according to a method according to any example, embodiment, aspect and/or claim disclosed herein.

Certain examples of the present disclosure provide a second network entity (e.g., an IAB-DU, an IAB-Donor-DU or an IAB-MT) configured to cooperate with a first network entity of the preceding example according to any example, embodiment, aspect and/or claim disclosed herein.

Certain examples of the present disclosure provide a network (e.g., IAB network) or wireless communication system comprising a first network entity and a second network entity according to any example, embodiment, aspect and/or claim disclosed herein.

Certain examples of the present disclosure provide a computer program comprising instructions which, when the program is executed by a computer or processor, cause the computer or processor to carry out a method according to any example, embodiment, aspect and/or claim disclosed herein.

Certain examples of the present disclosure provide a computer or processor-readable data carrier having stored thereon a computer program according to the preceding examples.

Figure 4:
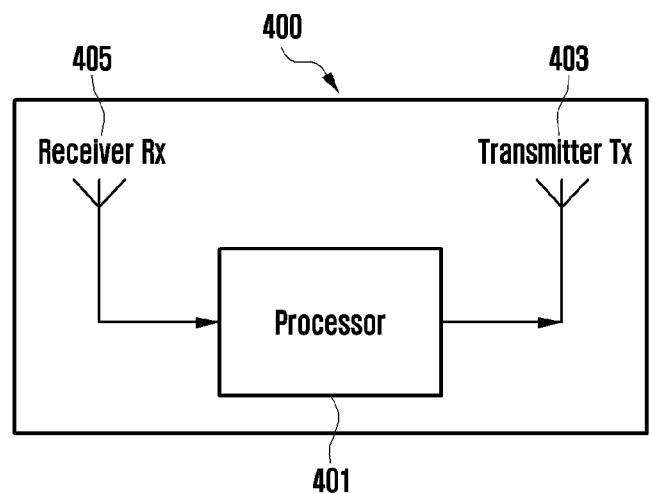
FIG. 4 illustrates a block diagram of an exemplary network entity according to an embodiment of the disclosure.

FIG. 4 illustrates a block diagram of an exemplary network entity (e.g., IAB Node or IAB Donor) that may be used in examples of the present disclosure. The skilled person will appreciate that the network entity illustrated in FIG. 4 may be implemented, for example, as a network element on a dedicated hardware, as a software instance running on a dedicated hardware, or as a virtualised function instantiated on an appropriate platform, e.g., on a cloud infrastructure.

The entity 400 comprises a processor (or controller) 401, a transmitter 403 and a receiver 405. The receiver 405 is configured for receiving one or more messages from one or more other network entities. The transmitter 403 is configured for transmitting one or more messages to one or more other network entities. The processor 401 is configured for performing operations as described above.

While the disclosure has been shown and described with reference to certain examples, it will be understood by those skilled in the art that various changes in form and detail may be made therein without departing from the scope of the disclosure, as defined by the appended claims.

Certain examples of the present disclosure provide one or more techniques as disclosed in the appended annex to the description. The skilled person will appreciate that any of these techniques may be applied in combination with any of the techniques described above and illustrated in the figures.

Although the present disclosure has been described with various embodiments, various changes and modifications may be suggested to one skilled in the art. It is intended that the present disclosure encompass such changes and modifications as fall within the scope of the appended claims.

What is claimed is:

1. A method performed by a child node of an integrated access and backhaul (IAB) for providing a buffer status report (BSR) in a network, the method comprising:
   receiving, from a parent node of the IAB, information on an identity (ID) of a logical channel group (LCG) via a radio resource control (RRC) signaling, in case that a number of LCGs to which logical channels are allocated is greater than a first maximum number of LCGs, wherein the information on the ID of the LCG is associated with a second maximum number of LCGs being 256; and
   selecting a format of the BSR from among at least two BSR formats,
   wherein the format of the BSR is selected based on a number of LCGs having data available for transmission and the information on the ID of the LCG.

2. The method of claim 1, wherein the format of the BSR is selected further based on one or more of a size of a grant, a size of a padding, a number of LCGs of a certain minimum priority, or a required level of a BSR granularity.

3. The method of claim 1,
   wherein the at least two BSR formats include a legacy BSR format and an extended BSR format.

4. The method of claim 3,
   wherein the legacy BSR format is one of a short format, a long format, a short truncated format, or a long truncated format, and
   wherein the extended BSR format is one of an extended short format, an extended long format, an extended short truncated format or an extended long truncated format.

5. The method of claim 3,
   wherein the legacy BSR format comprises one octet including an LCG ID field of length 3 bits and a buffer size field of length 5 bits, and the extended BSR format comprises two octets including an LCG ID field of length 8 bits and a buffer size field of length 8 bits, and
   wherein the buffer size field indicates a total amount of data available for transmission associated with an LCG identified based on the LCG ID field.

6. The method of claim 1, wherein selecting the format comprises switching from a first format of a BSR to a second format of a BSR as a response to a change of a logical channel (LCH) grouping or as a response to estimated number of padding bits.

7. The method of claim 1, wherein the selected format is indicated in the network based on one or more of:
   an RRC configuration,
   the RRC signaling reconfiguring the number of LCGs,
   a number of LCGs for which buffer status is configured to be reported,
   a number of LCGs for which buffer status is reported, and
   a medium access control (MAC) signaling.

8. The method of claim 1, wherein the equipment child node is an integrated access and backhaul (IAB)-mobile termination (MT) of a child node in an IAB network.

9. The method of claim 1, wherein the selected format is indicated in the network based on a logical channel identity (LCID) or an extended LCID (eLCID) associated with a BSR having the selected format.

10. The method of claim 1,
    wherein at least one of a first grouping of logical channels into a first number of LCGs, or a second grouping of logical channels into a second higher number of LCGs is configured, and
    wherein the format of BSR is selected based on which grouping or groupings of logical channels are configured and the number of LCGs having buffer status to report.

11. The method of claim 10, wherein in case that both the first grouping and the second grouping are configured, the format of BSR is selected from a first BSR format capable of indicating buffer status for the first number of LCGs and a second BSR format capable of indicating buffer status for the second higher number of LCGs.

12. The method of claim 1, further comprising:
    receiving a BSR having a format capable of indicating buffer status for up to a first number m of LCGs; and
    in case that a second higher number n of LCGs are configured, determining that up to m LCGs having a certain characteristic among the n LCGs have a buffer status reported in the received BSR, and that other LCGs among the n LCGs do not have buffer status reported,
    wherein the certain characteristic comprises one or more of:
      LCGs for which there is data available for transmission,
      LCGs for which there is new data available for transmission, highest priority LCGs, and
      highest priority LCGs among LCGs for which there is data available for transmission, and
    wherein the first number of LCGs is used in case that only a number not greater than m of LCGs corresponding to a pre-defined set of m LCG IDs have data to transmit.

13. A method performed by a parent node of an integrated access and backhaul (IAB) in a wireless communication system, the method comprising:
    identifying whether a number of logical channel groups (LCGs) to which logical channels are allocated is greater than a first maximum number of LCGs; and
    transmitting, to a child node of the IAB, information on an identity (ID) of a LCG, via a radio resource control (RRC) signaling, in case that the number of LCGs is greater than or equal to the first maximum number of LCGs,
    wherein a format of a buffer status report (BSR) is selected from among at least two BSR formats, based on a number of LCGs having data available for transmission and the information on the ID of the LCG, and
    wherein the information on the ID of the LCG is associated with a second maximum number of LCGs being 256.

14. The method of claim 13,
    wherein the first maximum number of LCGs is 8.

15. The method of claim 13,
    wherein the parent node is an integrated access and backhaul-distributed unit (IAB-DU), and
    wherein the child node is an integrated access and backhaul-mobile termination (IAB-MT).

16. A equipment child node of an integrated access and backhaul (IAB) in a network comprising:
a transceiver; and
at least one processor configured to:
receive, from a parent node of the IAB, information on an identity (ID) of a logical channel group (LCG) via a radio resource control (RRC) signaling, in case that a number of LCGs to which logical channels are allocated is greater than a first maximum number of LCGs, wherein the information on the ID of the LCG is associated with a second maximum number of LCGs being 256, and
select a format of a buffer status report (BSR) from among at least two BSR formats,
wherein the format of the BSR is selected based on a number of LCGs having data available for transmission and the information on the ID of the LCG.

17. The child node of claim 16,
wherein the at least two BSR formats include a legacy BSR format and an extended BSR format,
wherein the legacy BSR format is one of a short format, a long format, a short truncated format, or a long truncated format, and
wherein the extended BSR format is one of an extended short format, an extended long format, an extended short truncated format or an extended long truncated format.

18. The child node of claim 17,
wherein the extended BSR format comprises two octets including an LCG ID field of length 8 bits and a Buffer Size field of length 8 bits.

19. The child node of claim 17,
wherein the child node is an integrated access and backhaul (IAB)-mobile termination (MT) of a child node in an IAB network.

20. The child node of claim 17,
wherein the selected format is indicated in the network based on a logical channel identity (LCID) or an extended LCID (eLCID) associated with a BSR having the selected format.

21. The method of claim 13,
wherein the at least two BSR formats include a legacy BSR format and an extended BSR format.

22. The method of claim 21,
wherein the legacy BSR format is one of a short format, a long format, a short truncated format, or a long truncated format, and
wherein the extended BSR format is one of an extended short format, an extended long format, an extended short truncated format or an extended long truncated format.

23. The method of claim 13, wherein the selected format is indicated based on a logical channel identity (LCID) or an extended LCID (eLCID) associated with a BSR having the selected format.

24. A parent node of an integrated access and backhaul (IAB) in a wireless communication system, the parent node comprising:
a transceiver; and
at least one processor configured to:
identify whether a number of logical channel groups (LCGs) to which logical channels are allocated is greater than a first maximum number of LCGs, and
transmit, to a child node of the IAB, information on an identity (ID) of a LCG, via a radio resource control (RRC) signaling, in case that the number of LCGs is greater than the first maximum number of LCGs,
wherein a format of a buffer status report (BSR) is selected from among at least two BSR formats, based on a number of LCGs having data available for transmission and the information on the ID of the LCG, and
wherein the information on the ID of the LCG is associated with a second maximum number of LCGs being 256.

25. The parent node of claim 24,
wherein the first maximum number of LCGs is 8, and
wherein the at least two BSR formats include a legacy BSR format and an extended BSR format.

\* \* \* \* \*